United States Patent Office 3,309,182
Patented Mar. 14, 1967

3,309,182
POLYETHER DIAMINE AS STABILIZER FOR PETROLEUM DISTILLATE FUELS
Richard P. Crowley, Milton, Mass., and William E. Lovett, Westfield, N.J., assignors to Esso Research and Engineering Company, a corporation of Delaware
No Drawing. Filed Apr. 13, 1966, Ser. No. 542,226
4 Claims. (Cl. 44—72)

This is a continuation-in-part of application Ser. No. 224,210, filed Sept. 17, 1962, now abandoned.

This invention relates to improved petroleum distillate oils. More particularly, the invention concerns stabilizing petroleum oils against the formation and precipitation of sediment.

It is well recognized that heating oils, jet engine fuels, and other middle distillate fuel products derived from petroleum origin often contain unstable compounds which tend to decompose and form sludge and sediment during storage.

The present invention provides a class of additives which are effective in very small quantities for inhibiting the formation of sludge and sediment in petroleum distillate fuels boiling in the range of from 75° to 900° F. Such fuels include heating oils meeting the requirements for Grades 1 and 2 fuel oils, as set forth in ASTM Specification D–396–48T, diesel fuels falling within Grades 1D, 2D, and 4D of ASTM Specification D–975–51T, and jet engine fuels, such as those covered by U.S. Military Specification MIL–F–5624C. The additives of this invention are particularly effective in inhibiting sludge formation and as dispersants in petroleum fuels, e.g., heating oils, containing partially unsaturated stocks derived from thermal or catalytic cracking operations in quantities exceeding about 10% by volume. Such fuels are especially subject to sludging.

It is an object of this invention to provide a class of additives which stabilize petroleum distillate fuel oils against sludge formation and precipitation.

Other objects will be apparent from the following description of the invention.

Broadly the stabilizing additives of this invention are polyether amines, such as substituted or unsubstituted polyalkoxy polyamines for example, polyalkoxy diamines. The alkoxy groups may contain substituent groups, such as halogens, e.g., chlorine, bromine, or iodine; aryl groups, e.g., phenyl and cresyl; cyano groups; and the like.

As used herein, the term "polyether" is intended to include linear and branched polyethers having at least one and preferably a plurality of ether linkages and containing at least two amino groups and being substantially free from functional groups other than amino. Especially preferred are the polyalkoxy amines, such as the polyalkoxy diamines such as polyethoxy diamine, polypropoxy diamine, polybutoxy diamine, and the like. These polyalkoxy diamines can be characterized by reference to the following general formula:

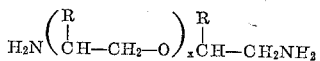

wherein R is hydrogen or an alkyl group of from 1 to about 3 carbon atoms and wherein subscript $x$ represents a positive integer in the range of from 1 to about 200. For example, $x$ is 33 for the polypropoxy diamine described in Example 1; $x$ is 16 for the polypropoxy diamine shown in Example 2; and $x$ is 34 for the polybutoxy diamine shown in Example 3.

The additives suitable for use herein should have a molecular weight of from about 600 to about 5,000 and preferably from 1,300 to 3,000. A preferred range of the physical properties of a polyether diamine, i.e., polyoxypropylene polymer suitable for use herein is presented in the following Table I.

TABLE I

| | |
|---|---|
| Specific gravity, 20/20° C. | 0.997–0.998. |
| Viscosity: | |
| 100° F., cks. | 50–200. |
| 210° F., cks. | 10–50. |
| Total alkalinity, meq./gm. | 0.5–2.0. |
| Primary amine, meq./gm. | 0.5–2.0. |
| Total acetylatables, meq./gm. | 0.5–1.5. |
| Color | Colorless to light yellow. |
| Pour point, ° F. | –50 (approx.). |
| Flash point, ° F. | 500–550. |
| Weight per gallon, 20° C., lbs. | 830 (approx.). |
| Solubility in water | None to about 10% by weight (depending on molecular weight and temperature of water). |

The additives described herein are effectively employed in petroleum distillate fuels in minor amounts. The additives are effective in amounts ranging from 0.01 wt. percent to 3 wt. percent, and particularly effective when employed in amounts ranging from 0.005 wt. percent to 0.05 wt. percent.

The polyether amines can be prepared by employing the appropriate substituted or unsubstituted alkylene oxide, ammonia, and a suitable catalyst. For example, a polyoxypropylene polymer containing two reactive primary amine groups, one at either end of the polymer chain, is prepared using such a process. Such polymers include "Polyether Diamine L–1000" and "L–2000."

The utility of the additives described herein is demonstrated by the following examples.

Example 1

Small amounts of polypropoxy diamine having the following characteristics.

| | |
|---|---|
| Molecular weight | 2000 |
| Specific gravity, 20/20° C. | 0.9975 |
| Viscosity: | |
| 100° F., cks. | 153.84 |
| 210° F., cks. | 24.40 |
| Total alkalinity, meq./gm. | 0.854 |
| Primary amine, meq./gm. | 0.838 |
| Total acetylatables, meq./gm. | 0.978 |
| Color | Light yellow |
| Solubility: | |
| In water, percent by wt. | 8.1 |
| Water in, percent by wt. | 11.1 |
| Flash point, ° F. | 515 |
| Weight per gallon, 20° C., lbs. | 8.31 | were added to a heating oil having the following characteristics.

| | |
|---|---|
| Gravity, API | 29.4 |
| Color, Tag-Robinson | 17.5 |
| Flash, ° F. | 164 |
| Sulfur, percent | 0.45 |
| Aniline point, ° F. | 121 |
| Distillation, ° F.: | |
| IBP | 348 |
| 10% | 454 |
| 50% | 517 |
| 90% | 594 |
| FBP | 654 |

The samples were evaluated in the 265° F. Sediment Stability test. This test entailed rapidly heating a 500 ml.

sample of the heating oil to a temperature of 265° F., maintaining that temperature for 6 hours while blowing the sample with air at a rate of about 40 cc./min., and rapidly cooling the sample to room temperature. The following data compare the heating oil containing the additives of this invention with the base heating oil and with the heating oil containing a well-known sludge inhibitor.

265° F. SEDIMENT STABILITY TEST (6 HOURS)

| | Amount, wt. percent | Additive | Wt. of deposit, mg. 100 ml. |
|---|---|---|---|
| Base Heating Oil | | None | 1.56 |
| Base Heating Oil | + 0.01 | Polypropoxy Diamine | 0.31 |
| Base Heating Oil | + 0.05 | Polypropoxy Diamine | 0.58 |
| Base Heating Oil | + 0.01 | Prior Art Additive [1] | 0.81 |

[1] Mixture comprising 8 parts of a $C_{12}$ tertiary alkyl primary amine and 1 part of a copolymer containing 8 parts of lorol methacrylate and 2 parts of beta diethylaminoethyl methacrylate.

The above data show that small amounts of the additive reduce the sludge formation in the base heating oil. Furthermore, the polyether diamine proved to be more effective than the prior art additive.

*Example 2*

In a manner similar to that of Example 1, small amounts of polypropoxy diamine having the following characteristics.

| | |
|---|---|
| Molecular weight | 1000 |
| Specific gravity, 20/20° C. | 0.9975 |
| Viscosity: | |
| 100° F., cks. | 65.72 |
| 210° F., cks. | 11.15 |
| Total alkalinity, meq./gm. | 1.675 |
| Primary amine, meq./gm. | 1.650 |
| Total acetylatables, meq./gm. | 1.80 |
| Color, Pt-Co | 125 |
| Pour point, ° F. | −35 |
| Flash point, ° F. | 504 |
| Weight per gallon, 20° C., lbs. | 8.30 | are added to a heating oil having the same characteristics as that of Example 1.

It is found that small amounts of the additive effectively reduces sludge formation in the base heating oil.

*Example 3*

Polybutoxy diamine having a molecular weight of about 2500 is added to a jet fuel in an amount of about 0.02 wt. percent. Sediment Stability tests indicate that the additive acts as a sludge inhibitor.

The jet fuel containing the additive is then tested in a jet aircraft, e.g., a B-52, at an altitude of from 40,000 to 45,000 feet until the bulk fuel temperature in the fuel tanks decreases to at least −20° F. or lower. The additive acts as an anti-icing agent and prevents plugging of the fuel systems at points of restricted flow, such as filters, valves, orifices, etc., due to ice formation.

The additives can be used alone or in combination with other heating oil additives, such as tertiary alkyl primary amines; polymeric dispersants like copolymers of lauryl methacrylate and vinyl acetate; quaternary ammonium salts such as hydroxide and chlorides, e.g., dimethyldicoco quaternary ammonium chloride.

In addition to being effective stabilizers in jet fuels, heating oils, and the like, the additives described herein are effective anti-icing agents in gasoline, jet fuels, and the like. For this purpose, they are generally used in amounts ranging from 0.0005 wt. percent to 1.0 wt. percent, either alone or in combination with other fuel additives such as alcohols like alkanols, e.g., isopropanol; amino alcohols such as aminoethylpropanol; polymers exhibiting surfactant characteristics such as polyacrylates and polymethacrylates.

What is claimed is:

1. An improved petroleum distillate fuel boiling in the range of from 75° to 900° F. having incorporated therein a minor stabilizing amount of a polyalkoxy diamine having the general formula:

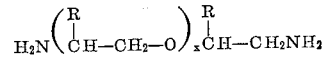

wherein R is a hydrogen or an alkyl group of from 1 to about 3 carbon atoms and wherein subscript $x$ represents a positive integer in the range of from 1 to about 200.

2. The fuel according to claim 1 wherein said polyalkoxy diamine has a molecular weight of from 1,000 to 3,000.

3. The fuel of claim 1 wherein said polyalkoxy diamine is a polyalkoxy propylene.

4. The fuel according to claim 1 wherein said minor stabilizing amount is from 0.001 wt. percent to 3 wt. percent.

No references cited.

DANIEL E. WYMAN, *Primary Examiner.*

Y. H. SMITH, *Assistant Examiner.*